(12) United States Patent
Baker (10) Patent No.: US 7,864,770 B1
(45) Date of Patent: Jan. 4, 2011

(54) ROUTING MESSAGES IN A ZERO-INFORMATION NESTED VIRTUAL PRIVATE NETWORK

(75) Inventor: Frederick Juergens Baker, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1239 days.

(21) Appl. No.: 11/422,036

(22) Filed: Jun. 2, 2006

Related U.S. Application Data (60) Provisional application No. 60/722,837, filed on Sep. 29, 2005.

(51) Int. Cl.
*H04L 12/28* (2006.01)
*H04L 12/56* (2006.01)

(52) U.S. Cl. .................................. 370/392; 370/395.31

(58) Field of Classification Search .................. None
See application file for complete search history.

(56) References Cited

U.S. PATENT DOCUMENTS

| 7,116,681 | B1 * | 10/2006 | Hovell et al. ............... 370/466 |
| 2002/0150114 | A1 * | 10/2002 | Sainomoto et al. .......... 370/402 |
| 2004/0255045 | A1 * | 12/2004 | Lim et al. .................. 709/245 |
| 2008/0301312 | A1 * | 12/2008 | Fernandes et al. .......... 709/230 |

\* cited by examiner

*Primary Examiner*—Chirag G Shah
*Assistant Examiner*—Srinivasa R Reddivalam
(74) *Attorney, Agent, or Firm*—Patterson & Sheridan, LLP (57) ABSTRACT

A mechanism for generating an address of a cyphertext component of a VPN router in a nested VPN system using an address of a plaintext domain so that a PTX domain has no knowledge about IP addressing in a CTX domain and vice versa. The mechanism advantageously avoids storing correlation between CTX addresses and PTX addresses, thereby maintaining a zero information requirement in a nested VPN routing.

17 Claims, 7 Drawing Sheets

ROUTING MESSAGES IN A ZERO-INFORMATION NESTED VIRTUAL PRIVATE NETWORK

CROSS-REFERENCE TO RELATED APPLICATION

This application claims the benefit of U.S. Provisional Application No. 60/722,837, entitled "Routing Messages in a Zero-Information Nested Virtual Private Network," filed Sep. 29, 2005, which is incorporated by reference herein in its entirety.

BACKGROUND

1. Field of Invention

The present invention relates generally to routing messages over a network, and more particularly, to routing messages in a nested virtual private network.

2. Background of the Invention

A virtual private network (VPN) establishes a private or secure network connection within a public network, such as the Internet. The data sent across the public network is encrypted. A typical example of a use of the VPN is a company network with two offices in different cities. Using the public Internet, the two offices can merge their networks into one network and encrypt the traffic transported over the encrypted cloud across the public network. A nested VPN is a network that has a variety of enclaves that communicate across the encrypted cloud, which is invisible to them and to which they are invisible. An enclave includes an arbitrary number of hosts connected to a local area network (LAN), wide area network (WAN), or the like.

In VPNs supporting Internet Protocol, Version 6 (IPv6 protocol), a VPN router that routes IP packets between any two enclaves has two components, either logical or physical—a cyphertext component and a plaintext component. A cyphertext component is connected to a cyphertext (CTX) domain, such as public Internet. In the CTX domain messages are sent with additional encryption. A plaintext component is connected to a plaintext (PTX) domain, for example, a Local Area Network (LAN). In the PTX domain messages are sent without additional encryption. For purposes of this description, the words "enclave" and "PTX domain" will be used interchangeably. A CTX component of the VPN router has a CTX Internet Protocol (IP) address. Similarly, a PTX component has a PTX IP address.

When messages are routed between any two PTX domains, a VPN router connected to the sending PTX domain needs to know which VPN routing peer to use to send messages to the receiving PTX domain. In addition, the VPN router of the sending domain needs to know an address of the CTX component of that VPN routing peer so that the VPN router can set up a security association with that VPN routing peer. Routing in a nested VPN, however, requires that a PTX domain has no knowledge about IP addressing in a CTX domain and vice versa. More specifically, the information regarding the CTX domain, such as a CTX IP address of a VPN router, preferably is unknown to the PTX domain and vice versa.

One known solution that avoids leaking such information across domains involves sending a broadcast request to all routers and waiting for a response from the appropriate router. This solution, however, is not scaleable in networks having more than several hundreds of enclaves. In addition, it presents a bandwidth problem if there are many VPN Routers in the network, as each time a new request is sent to a new router all other routers receive the message.

Another solution to this problem is configuring a VPN router so that it has a security association with any possible router in the system. Again, this solution has a scalability problem as the number of routers increases.

Another approach requires creating a directory that stores the information regarding each authorized security association between VPN routers. The drawback of this approach is that maintaining a single directory introduces a single point of failure and that the directory knows the association between PTX and CTX domains.

Accordingly, it is desirable to have a mechanism that solves the problem of maintaining a zero-information between PTX domain and CTX domain and overcomes the limitations of the prior art solutions.

SUMMARY OF THE INVENTION

A system, a method, and a computer program product that generates an address of a cyphertext component of a VPN router in a nested VPN system using an address of a plaintext domain connected to the VPN router so that a PTX domain has no knowledge about IP addressing in a CTX domain and vice versa. This solution avoids storing correlation between CTX addresses and PTX addresses, thereby maintaining a zero information requirement in a nested VPN routing.

According to one embodiment of the present invention, a VPN router generates an address of its CTX component as follows. A PTX component of a VPN router hashes a prefix of a PTX domain to which the PTX component connects. In one embodiment, the PTX component uses a one way hash to generate a hashed value of the prefix; in another, it might encrypt the address using a suitable cipher, or perform some other occluding mathematical function on it. A person of ordinary skill in the art would understand that other methods can be used to generate an address of a CTX component. The PTX component sends the hashed prefix to the CTX component of the VPN router. In one embodiment, the CTX component forms the address using the hashed prefix. In one implementation, the CTX component concatenates the prefix of a CTX domain to which it is connected with the hashed prefix of the PTX domain. The generated address includes a prefix part and a host part. The prefix part of the generated address is a prefix of the CTX domain. The host part is a hashed prefix of a PTX domain. The CTX component advertises its address in a link state database. In another embodiment, the CTX component advertises its address in a routing information database.

When a host of a sending PTX domain sends an IP packet to a host in a receiving PTX domain, the sending host does not have information about a CTX address of a VPN router connected to the PTX receiving domain. The IP packet includes a payload, a protocol, and an address of a remote host. The PTX component of the VPN router extracts the prefix of the address of the remote host, hashes the prefix, and provides the prefix to a CTX component of the VPN router. The CTX component searches a security association database to determine whether it maintains a security association with a router having an IP address with the hashed value as a host part. If so, the CTX component identifies a prefix part of the IP address and sends the IP packet to the router identified by this IP address.

Alternatively, if the CTX component does not find an active security association with a VPN router having an IP address with the hashed value as a host part, the CTX component searches the link state database or the routing information database to find such as router. In one embodiment, the CTX component uses the hashed value to perform a right-to-left lookup in the database to find the router having the hashed value as the host part. If the address is found, the CTX component encapsulates the address into the IP packet and inserts a secure IP header that includes security parameters. The CTX component then opens a security association with that router using the security parameters. The CTX component encrypts the payload in the IP packet and sends the encrypted IP packet to the VPN router at the address specified in the IP packet. The VPN router of the receiving PTX domain receives the IP packet, removes the IP security header, decrypts the message, and forwards the message to the remote host.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

The figures depict one embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

System Architecture Overview

Figure 1:
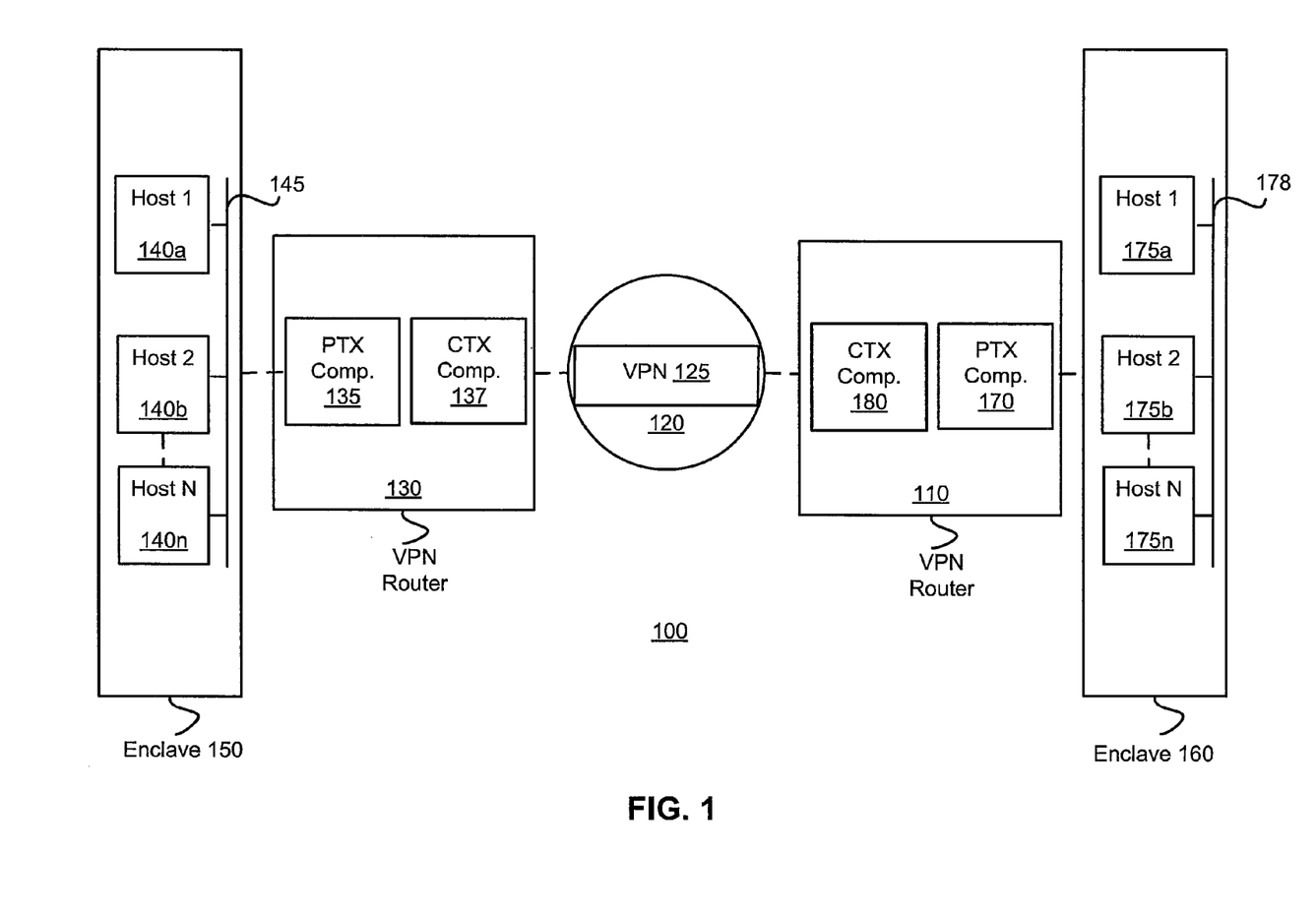
FIG. 1 is a block diagram of a nested VPN system according to an embodiment of the present invention.

FIG. 1 is a block diagram of a nested VPN system 100. System 100 includes at least two enclaves—enclave 150 and enclave 160 connected by a public network 120. An enclave is a collection of networks with an arbitrary number of hosts. Enclave 150 includes hosts 140a through 140n associated with users (hosts 140a through 140n are collectively referred to herein as "host 140"). A person of ordinary skill in the art would understand that any number of enclaves can be included in the nested VPN system 100.

Hosts 140 represent computer nodes connected to each other via communication network 145. Users of hosts 140 can share access to various resources on communication network 145, such as printers, disk drives or memory, can communicate with other hosts connected to communication network 145. Hosts 140 can be workstations, personal computers, handheld devices, or any other devices that employ web-browsing functionality. Hosts 140 also include, for example, a storage device, like a hard drive, fixed or removable storage device, a processor, and an input device. Communication network 145 can be a local area network (LAN), wide area network (WAN), intranet of any size, or any other network.

Enclave 160 includes hosts 175a through 175n associated with users (hosts 175a through 175n are collectively referred to herein as "host 175"). Hosts 175 represent computer nodes connected to each other via communication network 178. Like hosts 140 of the enclave 150, host s175 can be workstations, personal computers, and any other device that employ web browsing functionality. Communication network 178 can be a local area network (LAN), wide area network (WAN), intranet of any size, or any other network.

Each enclave 150 and 160 may represent a network location of an enterprise. Enclaves 150 and 160 may be connected over a public network, 120, such as the Internet, or another private or public network using the Internet technology. This document refers to network 120 as a public network without loss of generality. When host 140 within the enclave 150 sends an IP packet to host 175 within the enclave 160, the IP packet is routed across public network 120 using VPN 125. The data transmitted across the VPN 125 in encrypted form.

Each enclave 150 and 160 is a plaintext (PTX) domain since messages are sent within these enclaves without any additional encryption. Public network 120 is a cyphertext (CTX) domain as the messages are sent in this domain with additional encryption.

VPN routers 110 and 130 support communication between the hosts over the VPN 125. As was previously described, in VPN networks supporting IPv6 protocol, VPN routers comprise of two functional components—a plaintext component and a cyphertext component. VPN router 110, for example, consists of two functional components—a plaintext (PTX) component 170 and cyphertext (CTX) component 180. VPN router 130 similarly consists of two functional components—a PTX component 135 and CTX component 137.

When host 140 sends a message to host 175, VPN router 130 needs to know to which VPN router the message should be routed as well as an address of the CTX component of that router. As was previously described, to maintain security when routing messages between enclaves 150 and 160 it is desirable that a PTX domain does not have information about a CTX domain and vice versa. More specifically, PTX component 170 preferably has zero knowledge about an address of the CTX component 180 and vice versa. Similarly, PTX component 135 has zero knowledge about an address of CTX component 137 and vice versa. A mechanism for routing messages between PTX domains that addresses this problem is described in more detail below with reference to FIGS. 3 and 4.

Figure 2:
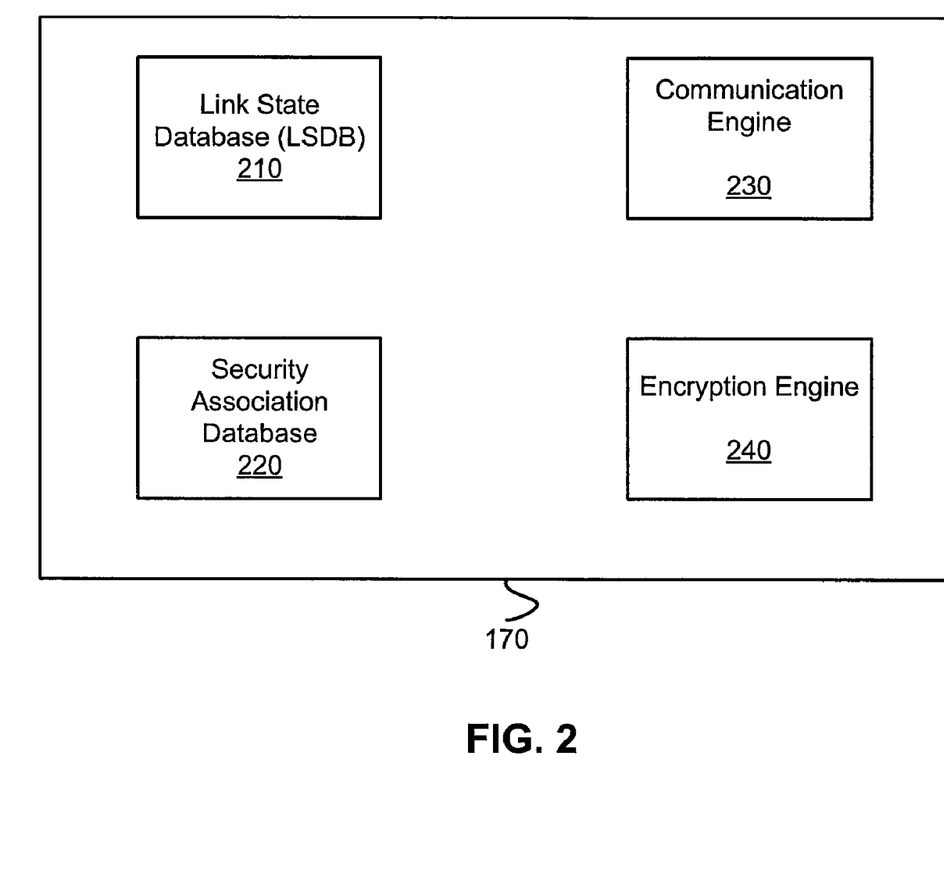
FIG. 2 is a block diagram of the components of a VPN router in the nested VPN system shown in FIG. 1.

Referring now to FIG. 2, a block diagram of functional modules of PTX component 170 of VPN router 110 is shown. Although FIG. 2 illustrates functional modules of PTX component 170 of VPN router 110, CTX component 180 of VPN router 110 as well as CTX and PTX components of VPN router 130 has similar functional modules. PTX component 170 includes a Link State Database (LSDB) 210, a security association database 220, a processing engine 230, and an encryption engine 240. Each router periodically multicasts a Router Advertisement from each of its components (PTX and CTX), announcing the internet protocol (IP) address(es) of that component. Hosts (such as host 140 and 175) use a neighborhood discovery (ND) mechanism to discover the addresses of their neighboring routers. The ND mechanism uses a set of messages and processes to determine relationship between neighboring nodes.

LSAs can be of different types. For example, Type 1 LSA is a Router LSA that advertises a link between any two routers. Type 9 LSA is a Prefix LSA. Type 9 LSA advertises the IP address of the router, a length of the prefix in the IP address, and a length of the link between the router and a neighboring router. The IP address of a router includes two parts: a prefix part and a host part. The prefix indicates an address of the network to which the router is connected and represents the most significant bits in the IP address. In IPv6, for example, an IP address is 128 bits, of which 64 most significant bits are allocated for prefix and 64 least significant bits are allocated for a host part of the IP address. The host part is a host address of the VPN router.

Figure 5:
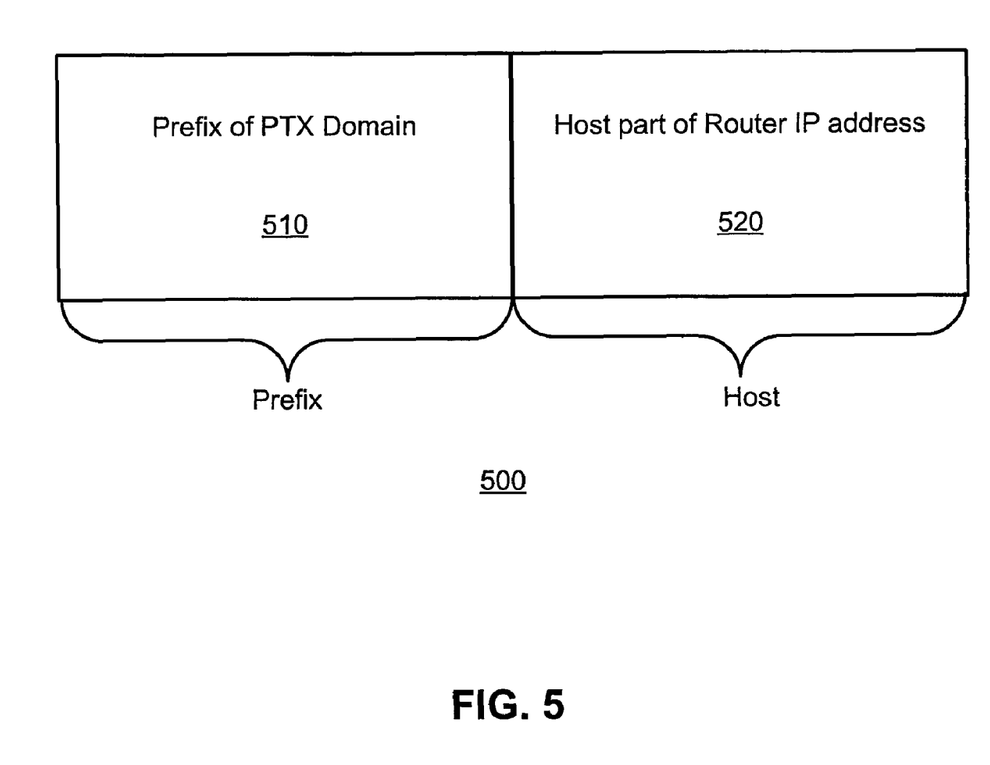
FIG. 5 is a diagram of a structure of an address of a PTX component of a VPN router.

Referring now to FIG. 5, a structure of an exemplary IP address 500 of PTX component 170 of VPN router 110 is shown. In the IP address 500, prefix 510 is the prefix of PTX domain (in this example, PTX domain is enclave 160). The host part 520 of the address is a host part of IP address of the VPN router 110.

Figure 6:
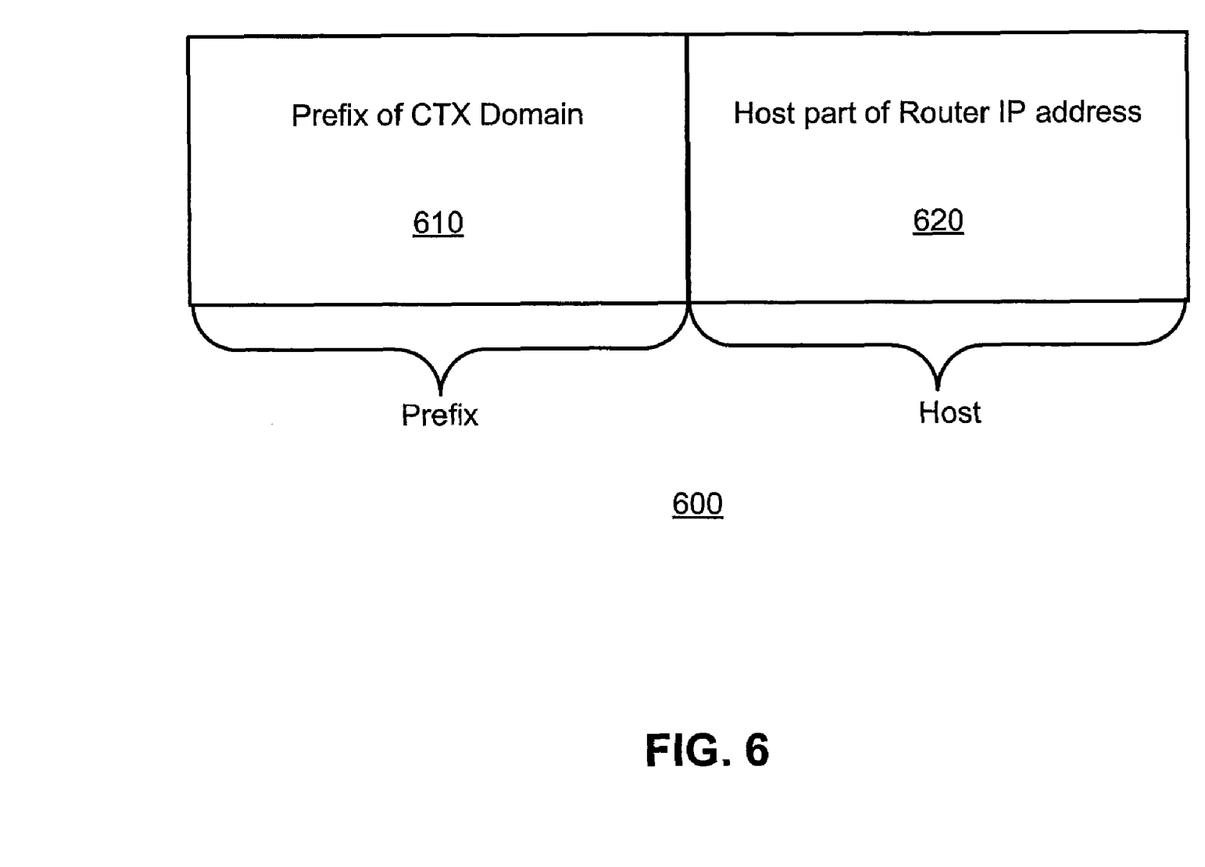
FIG. 6 is a diagram of a structure of an address of a CTX component of a VPN router.

Referring now to FIG. 6, a structure of an exemplary IP address 600 of CTX component 180 of VPN router 110 is shown. In the IP address 600, prefix 610 is a prefix of CTX domain (in this example, CTX domain is public network 120 and the rest of the address is a host part of IP address of the VPN router 110).

Security association database 220 is adapted to store security association (SA) records. Generally, security association describes a relationship between two or more entities with respect to the use of security services to communicate securely. A typical SA record in security association database 220 includes an IP address of the routers that established a security association. The record may also include encryption keys for sending messages between the routers.

Exemplary Methods of Operation

1. Forming a CTX Address Using a Stateless Address Auto Configuration

Figure 3:
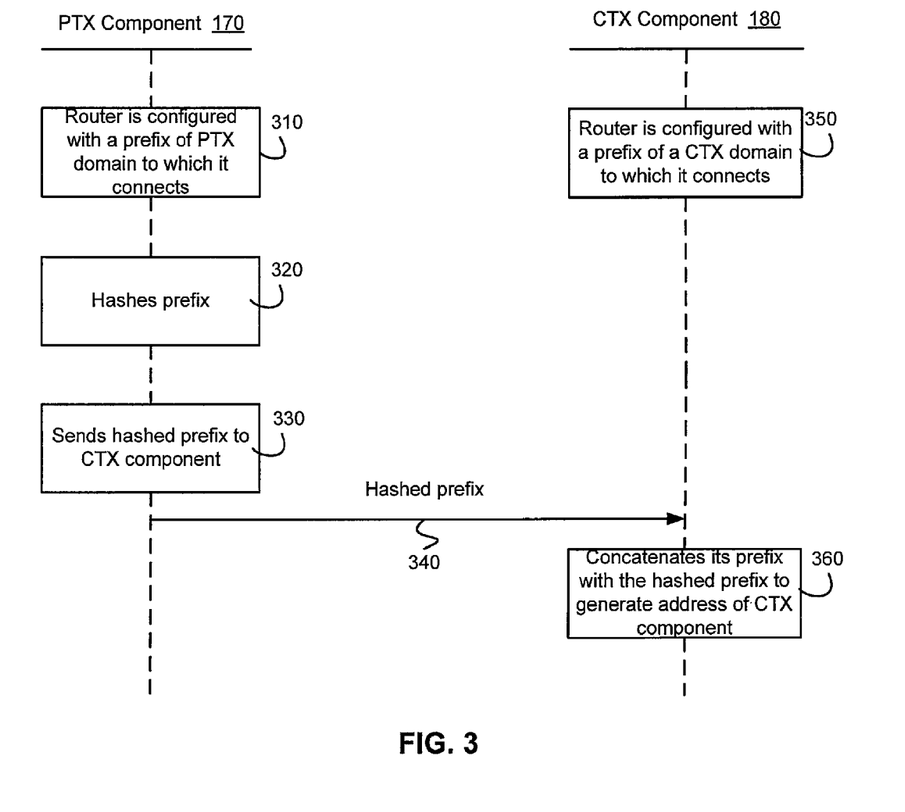
FIG. 3 is an event diagram of a method for generating a cyphertext address of a VPN router according to an embodiment of the present invention.

According to one embodiment, each VPN router initially generates an address of its CTX component. In one embodiment, the address is generated using a prefix of a PTX domain to which a VPN router is connected. FIG. 3 is an event diagram illustrating exemplary transactions performed by PTX component 170 of VPN router 110 and CTX component 180 of VPN router 110 to form a CTX address of a VPN router from an address of the PTX component. In FIG. 3, these entities are listed across the top. Beneath each entity is a vertical line representing the passage of time. The horizontal arrows between the vertical lines represent communication between the associated entities. It should be noted that not every communication between the entities is shown in FIG. 3. In other embodiments of the present invention, the order of the communication can vary.

Initially, PTX component 170 is configured 310 with a prefix of a PTX domain to which it is connected. For example, PTX component 170 is configured with a prefix of network 178 in enclave 160. In another embodiment, PTX component 170 is configured with an entire address that includes a prefix part and a host part. PTX component 170 publishes its prefix in LSDB 210.

As was previously described in reference to FIG. 2, PTX component 170 of VPN router 110 publishes its prefix in the LSDB 210 in the form of an LSA. An exemplary entry in the LSDB 210 for PTX component 170 of VPN router 110 has the following structure:

{IP address of PTX component 170 (prefix of PTX domain and host part of IP address); Length of prefix of address of PTX domain to which PTX component is connected; Length of the link between VPN router 110 and neighboring router}

CTX component 180 of VPN router 110, in turn, is configured 350 with a prefix of the CTX domain, such as public network 120, to which CTX component 180 of VPN router 110 is connected. CTX component 180 publishes its prefix in LSDB 210. An exemplary entry in the LSDB 210 for CTX component 180 of VPN router 110 has the following structure:

{IP address of CTX component; Length of prefix of address of CTX domain to which CTX component is connected; Length of the link between the router and its neighboring router}

PTX component 170 hashes 320 the prefix of PTX domain to which it is connected using, for example, a one way hash. Exemplary algorithms for hashing the prefix are MD5, CRC, and SHA1 although other algorithms can be used to generate a hashed value of the prefix. In another embodiment, the PTX component 170 encrypts the address using a suitable cipher, or performs some other occluding mathematical function on it. A person of ordinary skill in the art would understand that other methods can be used to generate an address of a CTX component. Communication engine 230 sends the hashed prefix of PTX domain to CTX component 180 of VPN router 110.

Figure 7:
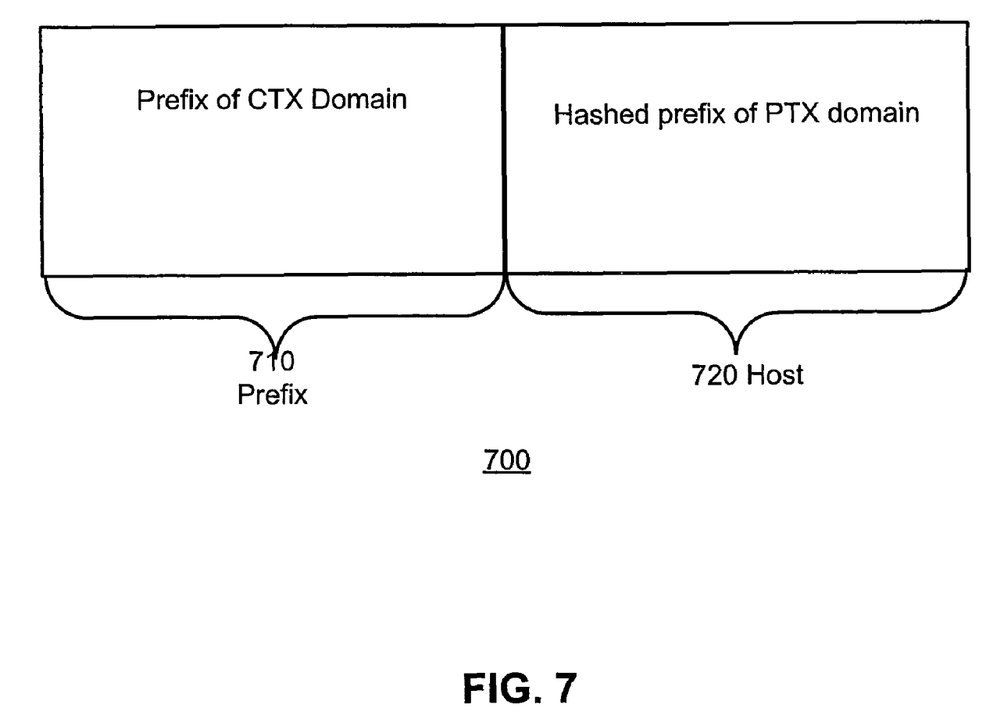
FIG. 7 is a diagram of a structure of an address of a CTX component of the VPN router formed using a prefix of a PTX domain to which the VPN router connects.

CTX component 180 receives the hashed prefix of PTX domain and generates an IP address of CTX component 180 using, for example, the stateless address autoconfiguration mechanism. In one embodiment, CTX component 180 concatenates prefix of CTX domain to which it is connected with the hashed prefix of the PTX domain to which PTX component 170 is connected. The generated address includes a prefix part and a host part. An exemplary structure of the generated address 700 is shown in FIG. 7. The prefix part 710 of the generated address is a prefix of CTX domain to which CTX component 180 is connected. The host part 720 of the generated address 700 is a hashed prefix of PTX domain to which PTX component 170 of VPN router 110 is connected (e.g., enclave 160). CTX component 180 advertises its IP address in LSDB 210.

2. Routing Between Enclaves

Figure 4:
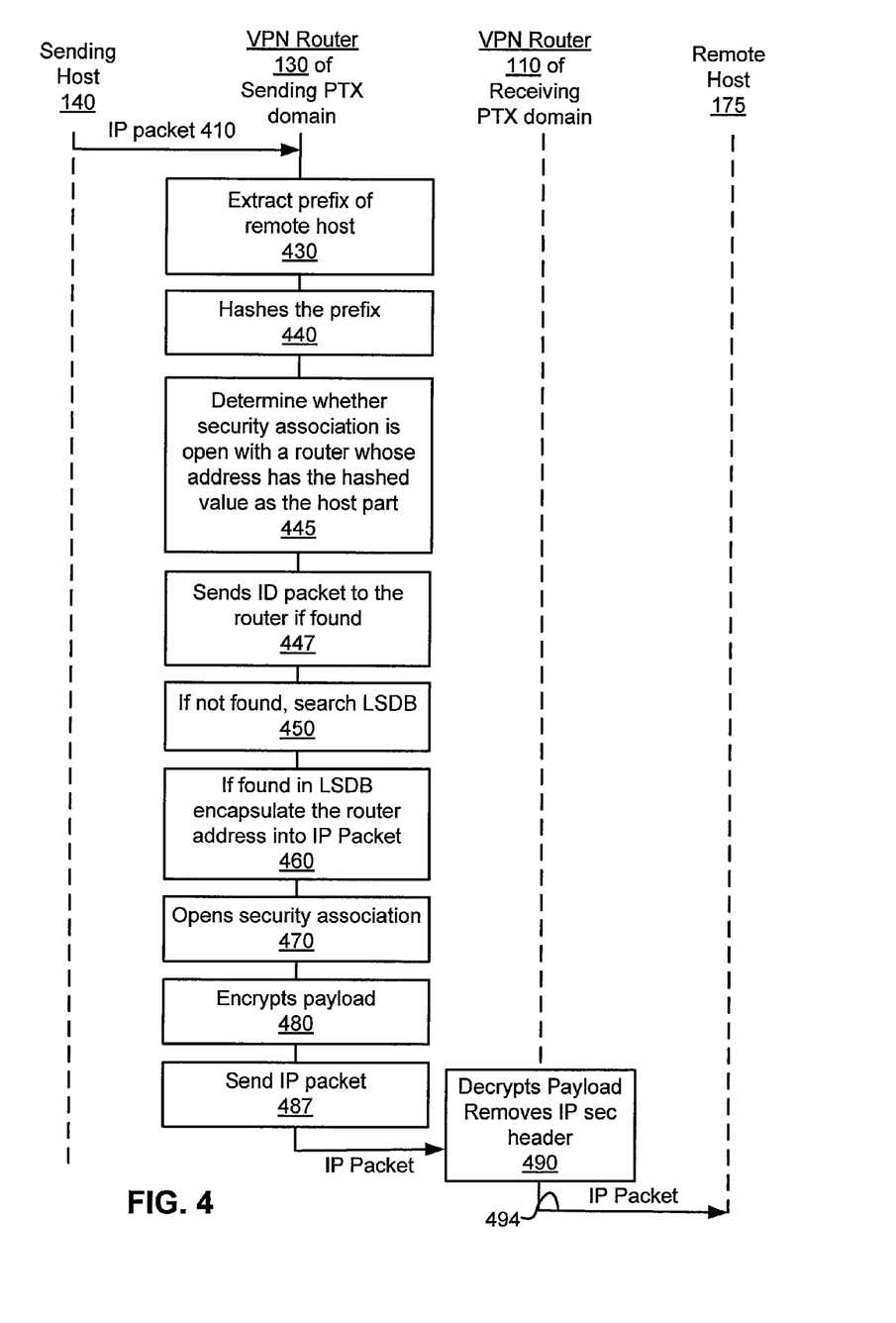
FIG. 4 is an event diagram of a method for routing an IP packet between two enclaves using the cyphertext address of the VPN router according to one embodiment of the present invention.

FIG. 4 is an event diagram illustrating exemplary transactions performed by a host in a sending PTX domain (e.g., host 140), a VPN router connected to the sending PTX domain (e.g., VPN router 130 connected to enclave 150), a VPN router of the receiving PTX domain (e.g., VPN router 110 connected to enclave 160), and a remote host 175. In FIG. 4, these entities are listed across the top. Beneath each entity is a vertical line representing the passage of time.

Initially, host 140 of enclave 150 sends a message in the form of an IP packet 410. An exemplary IP packet sent by host 140 includes the following:

Payload

TCP

IP header, which includes a source address of the sending host and a destination address of the remote host, e.g., an address of host 175 in enclave 160. An IP address of a host includes a prefix part and a host's address part. The prefix can be a prefix of a network to which the host is connected. The host address part indicates a host address of the remote host.

Host 140 maintains a routing table (not shown in FIGS. 1-4). The routing table stores entries that include information about various routes to a particular network destination. Host 140 searches the routing table for the route that is the closest match to the destination IP address. In one embodiment, host 140 chooses the closest route in the following order:

1. A route that matches the destination IP address.
2. A route that matches the destination with the longest prefix length.
3. The default route.

Assume for the purposes of this description, host 140 routes the IP packet to VPN router 130. VPN router 130 receives the IP packet and extracts 430 the prefix part from the IP address of the remote host 175. VPN router 130 hashes 440 the prefix using the same algorithm that was used to hash the prefix of enclave 160 when an address of CTX component 180 was formed. VPN router 130 passes the hashed prefix to its CTX component 137.

CTX component 137 of VPN router 130 determines 445 whether it has an active security association with any router with an IP address that includes the hashed value as its host part. In one embodiment, CTX component 137 uses security association database 220 to perform a right-to-left lookup. If CTX component 137 finds a router with an address that includes the hashed value as its host part, it forwards 447 the IP packet to that router.

Alternatively, CTX component 137 uses the hashed prefix of IP address of remote host 175 to search 450 LSDB 210 to find a router having the hashed prefix as the host part of the IP address. If it finds one, CTX component 137 identifies the prefix part of that address and encapsulates 460 the IP address of that router into the IP packet. CTX component 137 then opens 470 a security association with the router using, for example, an Internet Key Exchange (IKE) procedure. The IKE procedure creates a secure connection between the two hosts and then uses it to negotiate the secure association. As a result, encryption keys are exchanged between the VPN router 130 and the router whose IP address is encapsulated in the IP packet. Alternatively, if CTX component 137 does not find a router having the hashed prefix as the host part of the IP address, the IP packet is dropped.

CTX component 137 invokes encryption engine 240, which encrypts a payload in the IP packet and inserts an IP security header with security parameters for secure message transporting. In one embodiment, the security parameters include a sequence number to provide an anti-replay protection and a security parameter index (SPI). The IP packet sent over VPN 125 includes the following:

Encrypted payload
IP security header, which includes security parameters, information referring to the next header type, and a trailer that contains the checksum for authenticating the message
IP header, which includes address of CTX component of 180 of VPN router 110.

VPN router 130 sends 487 the IP packet to VPN router 110 at the address indicated in the IP header. VPN router 110 receives the IP packet, removes the IP header, and uses keys provided in the security parameters to decrypt 490 the payload. VPN router 110 sends 494 the IP packet to the remote host 175. The IP packet includes the following:

Decrypted Payload,
TCP
IP address of remote host 175*a*

Thus, the present invention provides a mechanism for generating an address of a CTX component of a VPN router using an address of a PTX domain to which the VPN router is connected in a nested VPN. The present invention overcomes the limitations of prior art approaches by providing a scaleable system that does not maintain the correlation between CTX addresses and PTX addresses.

The present invention has been described in particular detail with respect to several embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. In a nested Virtual Private Network (VPN) system having at least one plaintext (PTX) domain, a ciphertext(CTX) domain, and at least one VPN router connected to the PTX domain and the CTX domain, the PTX domain having an IP address and the CTX domain having an IP address, the at least one VPN router having a CTX component and a PTX component with an IP address having a prefix of the IP address of the PTX domain and a host address of the VPN router, a method for generating an IP address of the CTX component using the IP address of the PTX domain for routing a packet in the VPN system, the method comprising:
generating a hashed value of the prefix of the IP address of the PTX domain;
providing the hashed value of the prefix to the CTX component of the VPN router; and
generating the IP address of the CTX component with a prefix part and a host part, the prefix part represents a prefix of the CTX domain and the host part representing the hashed value of the prefix of the IP address of the PTX domain.

2. The method of claim 1, further comprising advertising the address in a routing information database.

3. The method of claim 1, further comprising advertising the address in a link state database.

4. In a nested Virtual Private Network (VPN) system having a sending plaintext (PTX) domain, a VPN router connected to the sending PTX domain, a receiving PTX domain, and a VPN router connected to the receiving PTX domain, each VPN router having a PTX component and a ciphertext (CTX) component, a method for routing IP packets between the sending PTX domain and the receiving PTX domain across a CTX domain, the method comprising:
receiving an IP packet, the IP packet including a payload and an IP address of a remote host in the receiving PTX domain, the IP address of the remote host including a prefix of the receiving PTX domain and a host address of the remote host;
extracting the prefix from the IP address of the remote host;
generating a hashed value of the prefix;
identifying a VPN router with an IP address having the hashed value as a host part of the IP address of the VPN router; and
responsive to identifying the router with the IP address having the hashed value as a host part, routing the IP packet to the VPN router.

5. The method of claim 4, further comprising:
responsive to not identifying the router with the IP address having the hashed value as a host part, dropping the IP packet.

6. The method of claim 4, further comprising:
responsive to having identified the router with the IP address having the hashed value as a host part, encapsulating the IP address into the IP packet;
establishing a security association with the router with the IP address having the hashed value as a host part; and
encrypting the payload in the IP packet.

7. The method of claim 4, further comprising, after identifying the VPN router and before routing the IP packet:
identifying whether a security association is open with the VPN router with the IP address having the hashed value as a host part.

8. A nested Virtual Private Network (VPN) system having at least one plaintext (PTX) domain, a ciphertext (CTX) domain, and at least one VPN router connected to the PTX domain and the CTX domain, the PTX domain having an IP address and the CTX domain having an IP address, the VPN router comprising:
a PTX component configured to generate a hashed value of a prefix of the IP address of the PTX domain;
a communication module configured to provide the hashed value of the prefix to a CTX component of the VPN router; and
the CTX component configured to generate an address that includes a prefix part and a host part, the host part represents the hashed prefix of the PTX domain and the prefix part represents a prefix part of the IP address of the CTX domain.

9. A nested Virtual Private Network (VPN) system having a first plaintext (PTX) domain, a first VPN router connected to the first PTX domain, a second PTX domain, and a second VPN router connected to the second PTX domain, each VPN router having a PTX component and a ciphertext (CTX) component, the system configured to route IP packets between the first PTX domain and the second PTX domain across a CTX domain, the system comprising:
a database configured to store IP addresses of the VPN routers;
the PTX component of the first VPN router configured to receive an IP packet from a host in the first PTX domain, the IP packet including a payload and an IP address of a remote host in the second PTX domain, extract a prefix from the IP address of the remote host, and hash the prefix to generate a hashed value;
a communication engine configured to send the hashed value to the CTX component of the first VPN router;
the CTX component of the first VPN router configured to receive the hashed value, identify in the database the IP address of the second VPN router having the hashed value as a host part of the IP address, and forward the IP packet to the VPN router having the hashed value as a host part of the IP address.

10. The system of claim 9, wherein the CTX component is further configured to:
drop the IP packet responsive to not identifying the router with the IP address having the hashed value as a host part.

11. The system of claim 9, wherein the CTX component is further configured to:
- encapsulate the IP address into the IP packet responsive to having identified the second VPN router with the IP address having the hashed value as a host part; and
- establish a security association with the router with the IP address having the hashed value as a host part.

12. The system of claim 9, further comprising:
- an encryption module configured to encrypt the payload in the IP packet prior to forwarding the IP packet to the second VPN router having the hashed value as a host part of the IP address.

13. The system of claim 9, wherein the system further comprises a security association database storing a plurality of records, a record in the database indicates a security association between routers in the system, and wherein the CTX component is further configured to:
- perform a lookup of the security association database to determine whether a security association is open with a router with the IP address having the hashed value as a host part; and
- forward the IP packet to the router responsive to having identified the router.

14. A computer program product comprising:
- a non-transitory computer-readable medium having computer program code embodied therein for routing IP packets between a sending plaintext (PTX) domain and a receiving PTX domain across a ciphertext (CTX) domain, the computer program code configured to:
  - receive an IP packet, the IP packet including a payload and an IP address of a remote host in the receiving PTX domain, the IP address of the remote host including a prefix of the receiving PTX domain and a host address of the remote host;
  - extract the prefix from the IP address of the remote host;
  - hash the prefix to generate a hash value;
  - identify a Virtual Private Network (VPN) router with an IP address having the hashed value as a host part of the IP address; and
  - responsive to identifying the router with the IP address having the hashed value as a host part, route the IP packet to the VPN router.

15. The computer program product of claim 14, further configured to:
- drop the IP packet, responsive to not identifying the router with the IP address having the hashed value as a host part.

16. The computer program product of claim 14, further configured to:
- encapsulate the IP address into the IP packet, responsive to having identified the router with the IP address having the hashed value as a host part;
- establish a security association with the router with the IP address having the hashed value as a host part; and
- encrypt the payload in the IP packet.

17. The computer program product of claim 14, further configured to:
- identify whether a security association is open with a router with the IP address having the hashed value as a host part; and
- forward the IP packet to the router, responsive to having identified the router.

* * * * *